(12) United States Patent
Carmona et al.

(10) Patent No.: US 8,899,282 B2
(45) Date of Patent: Dec. 2, 2014

(54) DEVICE FOR FILLING A TANK BY GRAVITY OR UNDER PRESSURE

(75) Inventors: Elodie Carmona, Aix en Provence (FR); Jean-Louis Gruyat, Marignane (FR); Frédéric Courtes, Nanterre (FR)

(73) Assignees: Airbus Helicopters, Marignane Cedex (FR); Quinson, Nanterre (FR)

( * ) Notice: Subject to any disclaimer, the term of this patent is extended or adjusted under 35 U.S.C. 154(b) by 823 days.

(21) Appl. No.: 13/012,969

(22) Filed: Jan. 25, 2011

(65) Prior Publication Data

US 2011/0315271 A1    Dec. 29, 2011

(30) Foreign Application Priority Data

Jan. 28, 2010    (FR) ..................................... 10 00326

(51) Int. Cl.
| | | |
|---|---|---|
| *B67C 3/00* | (2006.01) | |
| *B64D 37/00* | (2006.01) | |
| *B64D 37/16* | (2006.01) | |
| *F16K 15/06* | (2006.01) | |
| *F16K 17/12* | (2006.01) | |
| *F16K 17/196* | (2006.01) | |

(52) U.S. Cl.
CPC .............. *B64D 37/005* (2013.01); *B64D 37/16* (2013.01); *F16K 15/063* (2013.01); *F16K 17/12* (2013.01); *F16K 17/196* (2013.01)
USPC .............. 141/215; 141/98; 141/198; 141/206

(58) Field of Classification Search
CPC ....... B64D 37/16; B64D 37/005; B60K 15/04
USPC ...................... 141/84, 98, 198, 206, 215, 392, 141/291–296, 346, 347
See application file for complete search history.

(56) References Cited

U.S. PATENT DOCUMENTS

| | | | | |
|---|---|---|---|---|
| 2,737,401 | A | * | 3/1956 | Lindsay ......................... 137/553 |
| 2,849,019 | A | * | 8/1958 | Oliveau et al. ................. 137/391 |
| 3,171,448 | A | * | 3/1965 | Fromm .......................... 141/293 |
| 3,432,121 | A | * | 3/1969 | Delaney ..................... 244/17.11 |
| 3,476,140 | A | * | 11/1969 | Jusyk ............................. 137/392 |
| 3,513,887 | A | * | 5/1970 | Limandri ...................... 141/207 |
| 3,561,465 | A | * | 2/1971 | de Graaf ....................... 137/805 |
| 3,885,608 | A | * | 5/1975 | Ayres ............................ 141/354 |

(Continued)

FOREIGN PATENT DOCUMENTS

| | | |
|---|---|---|
| CN | 201338732 Y | 11/2009 |
| DE | 202006006249 U1 | 8/2007 |

(Continued)

OTHER PUBLICATIONS

Chinese Search Report, Application No. 201110037423.7, Applicant Eurocopter.

(Continued)

*Primary Examiner* — Timothy L Maust
(74) *Attorney, Agent, or Firm* — Brooks Kushman P.C.

(57) ABSTRACT

The present invention relates to a filler device (1) for filling a tank equally well by gravity or under pressure, the device being provided with a gravity filler spout (10) comprising a hollow tube (11). Furthermore, the device includes a pressure filler spout (20) inserted in the gravity filler spout (10) and reversibly fastened thereto.

19 Claims, 3 Drawing Sheets

(56) References Cited

U.S. PATENT DOCUMENTS

| | | | |
|---|---|---|---|
| 3,980,111 A * | 9/1976 | Badger | 141/367 |
| 4,328,844 A | 5/1982 | Becktel | |
| 4,611,618 A * | 9/1986 | Fournier et al. | 137/68.15 |
| 4,703,784 A * | 11/1987 | Fournier et al. | 141/198 |
| 4,907,630 A * | 3/1990 | Kulikowski et al. | 141/384 |
| 5,289,900 A | 3/1994 | Aho, Jr. | |
| 5,765,610 A * | 6/1998 | Brown | 141/383 |
| 7,146,730 B2 * | 12/2006 | Bergsma et al. | 29/890.124 |
| 7,757,709 B2 * | 7/2010 | Cortez | 137/393 |
| 2003/0107218 A1 * | 6/2003 | Anderson et al. | 285/360 |
| 2011/0319008 A1 | 12/2011 | Ameyugo | |

FOREIGN PATENT DOCUMENTS

| | | |
|---|---|---|
| FR | 1604551 A | 12/1971 |
| FR | 2226603 A1 | 11/1974 |
| FR | 2302930 A1 | 10/1976 |
| JP | 2003154886 A | 5/2003 |

OTHER PUBLICATIONS

Search Report and Written Opinion; Application No. FR 1000326: dated Sep. 30, 2010.

* cited by examiner

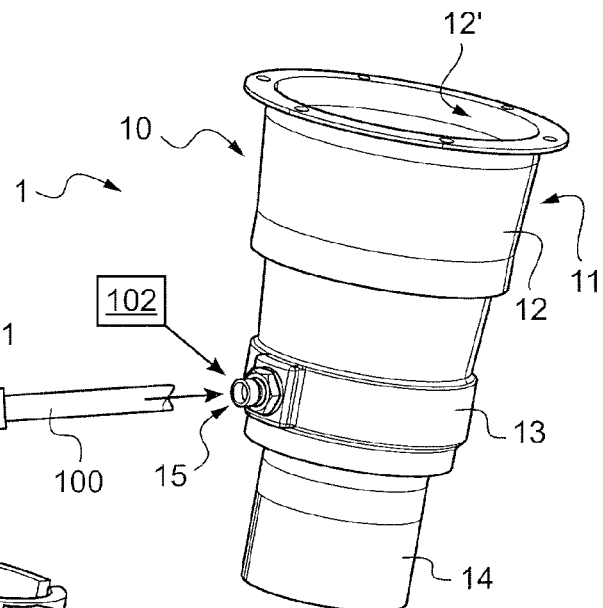
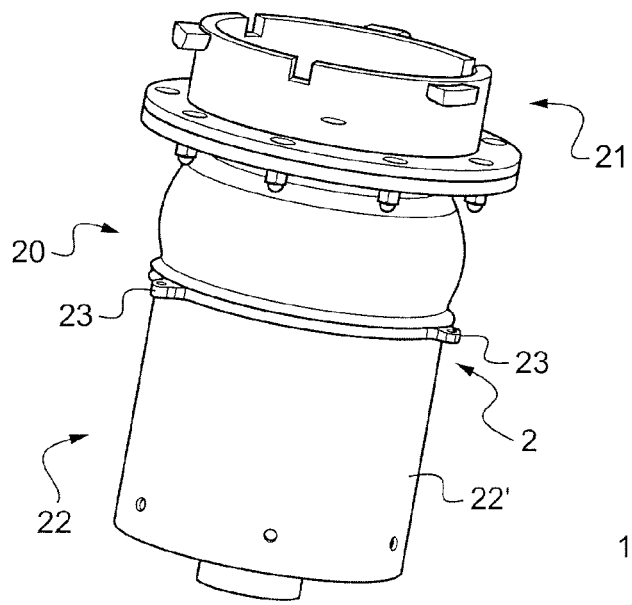
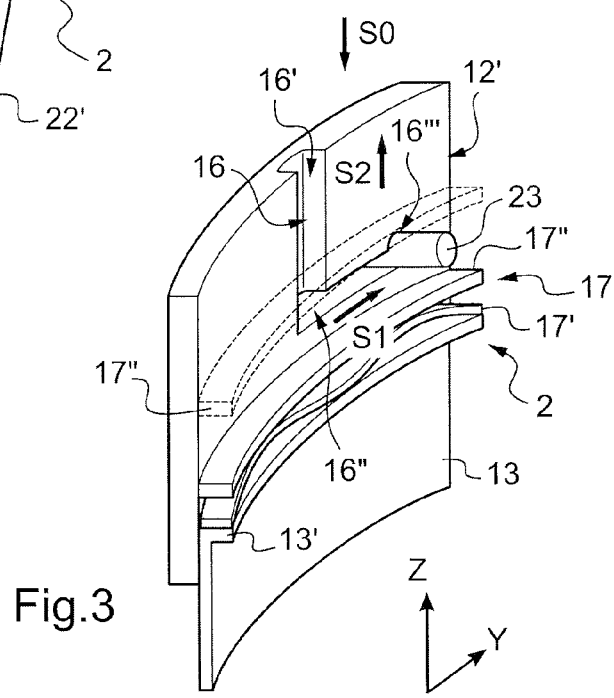

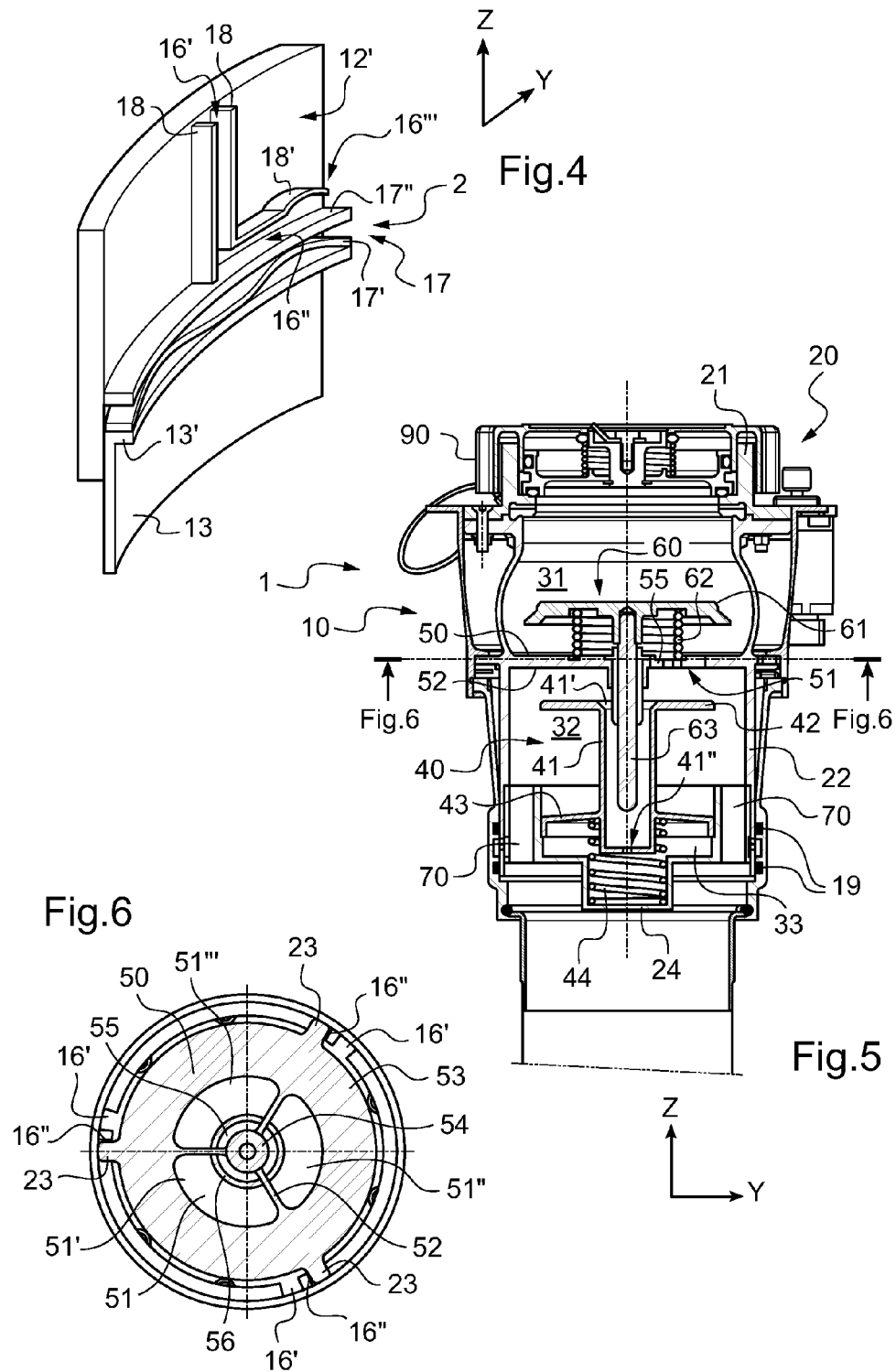

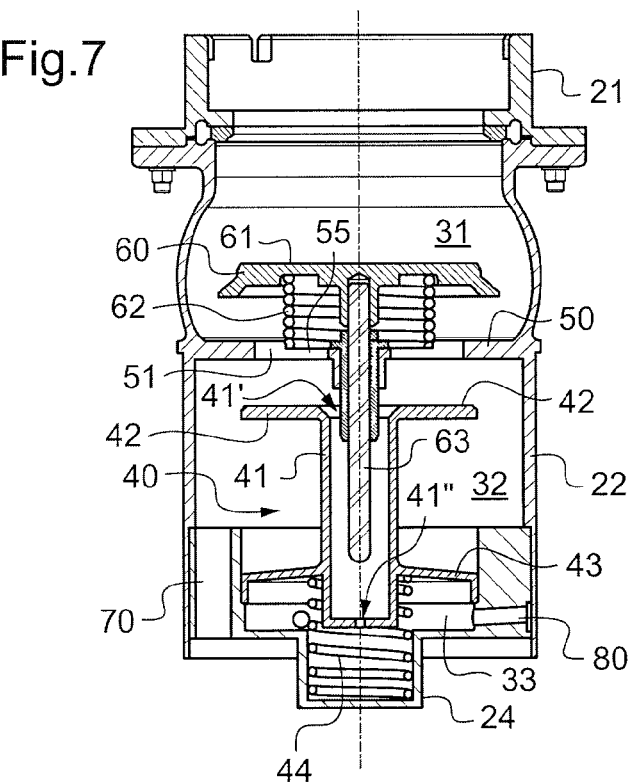
Fig.7
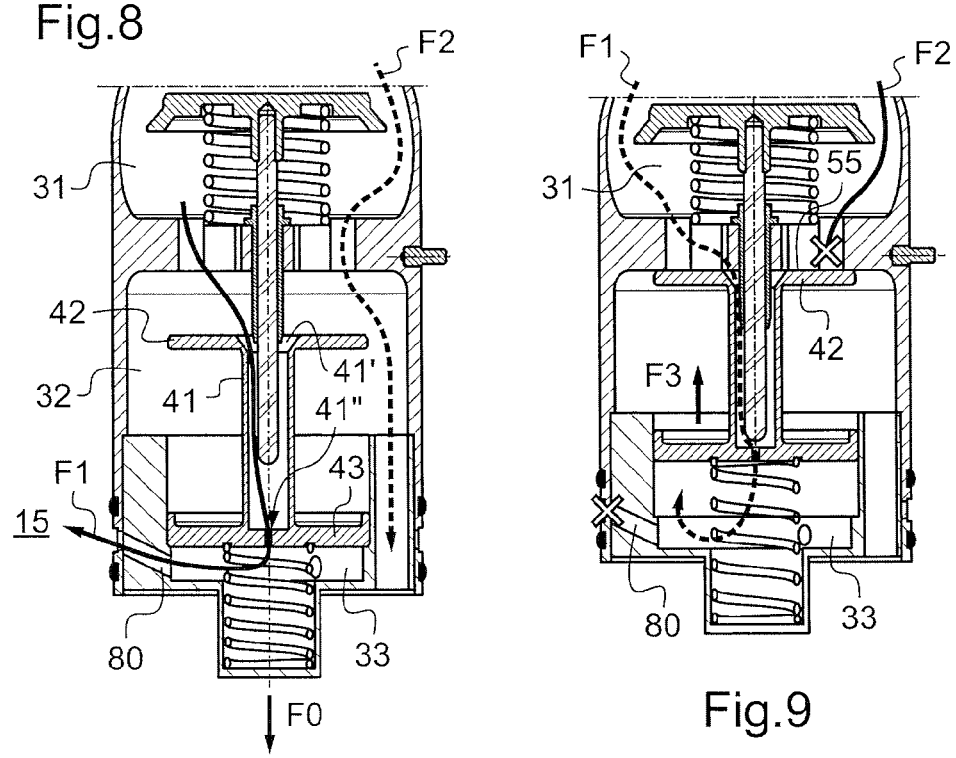
Fig.8
Fig.9

DEVICE FOR FILLING A TANK BY GRAVITY OR UNDER PRESSURE

CROSS REFERENCE TO RELATED APPLICATIONS

This application claims the benefit of FR 10 00326 filed on Jan. 28, 2010, the disclosure of which is incorporated in its entirety by reference herein.

FIELD OF THE INVENTION

The present invention relates to a device for filling a tank by gravity or under pressure.

BACKGROUND OF THE INVENTION

An aircraft, and in particular a helicopter type rotorcraft, usually includes gravity filler means in order to fill a tank using rudimentary means, e.g. a simple pipe.

By way of example, gravity filler means comply with the standard known under the name Stanag 3212. Conventionally, gravity filler means comprise an inlet duct opening out to a screen so as to avoid filling the tank with all kinds of pollutant.

The drawback of such gravity filling lies in particular in the time taken for filling, which remains relatively long.

In parallel, the fuel system is optionally provided with means enabling it to be filled under pressure, e.g. provided with a catch complying with the standard known under the name ISO 45. Document FR 2 226 603 presents a pressure filler valve provided with a solenoid enabling it to open.

Means for delivering fluid under pressure, e.g. a tanker truck, are then connected to the pressure filler means via a catch wheel so as to enable the tank to be filled very quickly.

The pressure filling valve may include mechanical end-of-filling control means that do not require the aircraft to be electrically powered, or electrical end-of-filling control means that require the aircraft to be electrically powered.

In addition, as described in document U.S. Pat. No. 4,328,844, a pressure filler value may also enable defueling to be performed quickly.

Thus, depending on the equipment required, an aircraft may include solely means for filling by gravity, means for filling by gravity and a pressure filler valve provided with mechanical end-of-filling control means, or indeed with gravity filler means and a pressure filler valve provided with electrical end-of-filling control means.

In order to cover these three different options, it is appropriate to provide three different versions of the aircraft, thereby leading in practice to significant cost and difficulties.

Document U.S. Pat. No. 5,289,900 describes means for filling a lubricant tank provided with a first filler orifice for filling by gravity and a second filler orifice for filling under pressure. In addition, the filler means include a discharge orifice enabling excess fluid to be removed.

Under such circumstances, the filler means according to that document U.S. Pat. No. 5,289,900 allow a leakage flow in the event of overflow, but do not provide means for stopping filling in mechanical or electrical manner.

SUMMARY OF THE INVENTION

A particular object of the present invention is to propose a universal filler device for a tank that enables all three possible options to be covered.

According to the invention, a filler device for filling a tank equally well by gravity or under pressure and provided with a gravity filler spout including a hollow tube is remarkable in that it includes a pressure filler spout inserted in the gravity filler spout and reversibly fastened thereto, i.e. inside said gravity filler spout.

According to another aspect, the pressure filler spout includes end-of-filling control means that co-operate with a pressure connector of the gravity filler spout when the pressure filler spout is fastened to the gravity filler spout.

The control means may then end filling at the required instant. It should be observed that the pressure connector may be closed mechanically or electrically depending on the embodiment.

Under such circumstances, the filler device is a universal device and does not require a plurality of variants to be installed.

If the user does not desire to proceed with filling under pressure, it suffices to avoid implementing the pressure filler spout in the gravity filler spout. Furthermore, as explained below, the pressure filler spout is capable of interrupting filling equally well in response to an electrical order or in response to a hydromechanical linkage.

The aircraft is thus designed for a single filler device that is fully adaptable to the desires of the user.

The filler device may also possess one or more of the following characteristics.

Thus, in one aspect of the invention, the pressure filler spout includes a connection coupling in compliance with the standards in force suitable for being locked to a catch wheel by applying a first clamping torque, and fastener means of the device include at least one bayonet stud that co-operates with a groove and with resilient pressure means for reversibly fastening the pressure filler spout to the gravity filler spout by applying a second clamping torque, greater than the first clamping torque.

Consequently, the fastener means act, for example, to prevent untimely separation of the gravity and pressure filler spouts when an operator disconnects the filling tanker from the connection coupling of the pressure filler spout.

Since the first coupling torque is defined by the standards that need to be complied with, it will readily be understood that the second torque is well defined. Thus, it is possible to select a second torque that is equal to the first torque multiplied by a safety margin, e.g. of the order of 10%.

Optionally, the bayonet stud is secured to an outside face of the pressure filler spout, and the groove being provided in an inside face of the gravity filler spout facing the outside face, the resilient pressure means blocking the bayonet stud in a retaining zone of the groove.

Furthermore, the device includes an inlet chamber through which a fluid penetrates into the pressure filler spout during a filling stage, the device being provided with an intermediate chamber separated from the inlet chamber by a stationary wall, the stationary wall including a filler orifice connecting the inlet chamber to the intermediate chamber, the intermediate chamber being provided with at least one filler channel suitable for directing the fluid towards a tank, the pressure filler spout being provided with control means for closing the filler orifice at the end of a pressure filling stage. Thus, the pressure filler base is provided with control means enabling a hydraulic connection to be made between the inlet chamber and the intermediate chamber during the stage of filling under pressure via the filler orifice and hydraulically insulating the inlet chamber from the intermediate chamber by closing said filler orifice at the end of said filling stage.

In order to enable the tank to be filled, the control means do not impede hydraulic communication between the inlet chamber and the intermediate chamber. In contrast, when the level of fluid in the tank has reached a predetermined level, the control means prevent fluid from passing from the inlet chamber towards the intermediate chamber. The fluid can then no longer pour into the tank via the filler channel(s).

It is conceivable that the control means include a control chamber permanently connected with the inlet chamber via a first control orifice provided in the stationary wall that co-operates with a hollow rod that is movable in the intermediate chamber.

It should be observed that the first control orifice may be a portion of the filler orifice or may be physically separate from the filler orifice, depending on the variant.

The hollow rod forms part of a piston that is suitable for moving in translation to close the filler orifice in order to prevent fluid from passing from the inlet chamber towards the intermediate chamber. Conversely, it should be observed that this fluid coming from the inlet chamber penetrates into the hollow rod independently of the position of said hollow rod in order to feed the control chamber.

In one variant, a first end of the hollow rod is provided with a first head and a second end of the hollow rod is provided with a second head.

Depending on the position of the hollow rod, the first head may isolate the inlet chamber from the intermediate chamber by closing the filler orifice between the inlet chamber and the intermediate chamber. However, the first head includes a second control orifice co-operating with the first control orifice in order to provide a permanent hydraulic connection between the inlet chamber and the hollow rod. For example, the first head is a disk perpendicular to a longitudinal axis of the hollow rod.

The second head separates the control chamber hydraulically from the intermediate chamber regardless of the position of the movable hollow rod. Nevertheless, the second head includes a third control orifice putting the hollow rod into communication with the control chamber.

Furthermore, the pressure filler spout may include resilient return means urging the first head to be pressed against the stationary wall so as to close the filler orifice.

Optionally, the pressure filler spout includes an escape channel suitable for hydraulically connecting the control chamber to a pressure connector of the gravity filler spout when the pressure filler spout is fastened to the gravity filler spout.

In a mechanical embodiment, the device may include a pipe opening out into a level detector, the pipe being fastened to the pressure connector.

In an electrical embodiment, the device may include a solenoid valve fastened to the pressure connector.

Thus, mechanical or electrical means close the pressure connector at the end of filling. This results in an increase in the pressure inside the control chamber, thereby causing the hollow rod to move in translation. The first head cuts off hydraulic communication between the inlet chamber and the intermediate chamber. Filling under pressure is thus interrupted.

BRIEF DESCRIPTION OF THE DRAWINGS

The invention and its advantages appear with greater detail from the following description of embodiments given by way of illustration and with reference to the accompanying figures, in which:

FIG. 1 shows a gravity filler spout of the filler device;
FIG. 2 shows a pressure filler spout of the device;
FIG. 3 shows a first variant of fastener means of the device;
FIG. 4 shows a second variant of fastener means of the device;
FIG. 5 is a longitudinal section through a filler device in a first embodiment;
FIG. 6 is a cross-section through a filler device in the first embodiment;
FIG. 7 is a section view of a pressure filler spout of a device in a second embodiment of the invention; and
FIGS. 8 and 9 are diagrams for explaining the operation of the device independently of the embodiment.

Elements that are present in more than one of the figures are given the same references in each of them.

DETAILED DESCRIPTION OF THE PREFERRED EMBODIMENT

FIG. 1 shows a gravity filler spout 10 of the filler device 1.

This gravity filler spout comprises a hollow tube 11 optionally provided with a top portion 12 and a bottom portion 13 and a screen 14. The top portion 12 may be made in compliance with the Stanag 3212 standard.

The bottom portion 13 is also provided with a pressure connector 15 suitable for being secured to a pipe 100 fitted with a level detector 101, e.g. of the ball valve type, or indeed with a solenoid valve 102. Such a solenoid valve is optionally controlled in application of predetermined logic, e.g. by a processor.

Thus, depending on the variant, when the tank for filling has reached a predetermined level, the pressure connector 15 is closed.

Furthermore, the inside face 12' of the tube 11 defines an inside space suitable for receiving a pressure filler spout.

FIG. 2 shows such a pressure filler spout 20 having a body 22 that is extended by a connection coupling 21 in compliance with the standards in force suitable for being connected to a catch wheel by applying a first clamping torque.

The device 1 then has connection means 2 for securing the pressure filler spout 20 inside the gravity spout 10, by applying a second clamping torque that is greater than the first clamping torque. Thus, when the operator performing filling under pressure disconnects the catch wheel from the connection coupling, it is necessary to apply the first clamping torque to said wheel. Since the first clamping torque is less than the second clamping torque, there is no risk of the operator then separating the pressure filler spout from the gravity filler spout.

Consequently, the connection means 2 include at least one bayonet stud 23 placed on the outside face 22' of the body 22 of the pressure filler spout, e.g. three bayonet studs uniformly distributed around said outside face 22'. It should be observed that this outside face faces the inside face 12' of the gravity filler spout 10 when the pressure filler spout 20 is arranged in the gravity filler spout 10.

FIGS. 3 and 4 show first and second variants of the fastener means 2.

Independently of the variant, the fastener means 2 comprise a groove 16 for each bayonet stud 23 and resilient pressure means 17 suitable for pressing each bayonet stud 23 into a retaining zone 16''' of the groove 16.

More precisely, each groove 16 is L-shaped, comprising a main groove 16' extending substantially along a longitudinal direction Z and a secondary groove 16'' extending substantially along a transverse direction Y, the secondary groove 16'' being provided with a retaining zone 16'''.

Thus, the operator positions each of the bayonet studs 23 in a main groove 16' and exerts a longitudinal force in a first direction S0 to push the pressure filler spout 20 into the gravity filler spout. Thereafter, the operator causes the pressure filler spout 20 to turn S1 so as to position each bayonet stud 23 in a retaining zone 16". The resilient pressure means 17 then push each bayonet stud 23 along a second direction S2 opposite to the first direction so as to maintain each bayonet stud in the associated retaining zone 16"'.

In the first variant of FIG. 3, the groove 16 is machined in the thickness of the gravity filler spout 10.

The resilient pressure means 17 then comprise a resilient member bearing against a shoulder of the gravity filler spout 10. For example, the resilient member is a spring or a spring blade 17' bearing against an edge 13' of the bottom portion 13 that acts as a shoulder. This resilient member then co-operates with a washer 17" suitable for pushing each of the bayonet studs 23.

More precisely, a first zone of each bayonet stud 23 is placed in the groove 16, while a projecting second zone of the bayonet stud 23 co-operates with the washer 17".

It should be observed that at rest, i.e. when the pressure filler spout 20 is not arranged in the gravity filler spout 10, the washer 17" may be above the secondary groove, i.e. in the position shown in dashed lines in FIG. 3.

In the variant of FIG. 4, the groove 16 comprises a main groove 16' defined by elevation guide means 18, and a secondary groove 16" defined by an abutment 18' and the washer 17" of the resilient pressure means 17. Each main groove 16' presents the advantage of guiding a corresponding bayonet stud 23, but it could optionally be omitted.

FIG. 5 is a longitudinal section of a filler device 1 in a first embodiment.

The device 1 thus comprises a gravity filler spout 10 having reversibly fastened therein a pressure filler spout 20.

If an operator seeks to perform filling by gravity, then the pressure filler spout 20 is separated from the gravity filler spout 10, and filling can be performed. Optionally, it is possible to provide a cable for attaching the pressure filler spout 20 to the gravity filler spout 10, or to a dedicated structure, so that said pressure filler spout is not mislaid during the operation of filling under gravity.

The pressure filler spout 20 thus comprises a body 22 having one end extended by a connection coupling 21 and another end fitted with a seat 24.

The device 1 may then be fitted with a cap 90 suitable for closing the connection coupling 21.

Furthermore, following the connection coupling 21, the body 22 defines an inlet chamber 31 and then an intermediate chamber 32, the intermediate chamber 32 leading to an annular filler channel 70 passing through the seat 24 in order to direct a fluid towards the screen 14 in the gravity filler spout 10. It can be understood that in the absence of such a screen 14, the fluid should be directed directly towards the tank for filling.

The inlet chamber 31 is then separated from the intermediate chamber 32 by a stationary wall 50. With the body extending along a longitudinal direction Z, the wall is arranged in a transverse direction Y. Furthermore, the stationary wall 50 has a filler orifice 51 to enable a fluid coming from a source for supplying the inlet chamber 31 to flow towards the intermediate chamber 32.

In addition, the pressure filler spout 20 possesses mechanical control means 40 suitable for preventing said flow when the tank for filling has reached the desired filling level. Thus, when the pressure connector 15 is closed, the control means 40 close the filler orifice so as to terminate filling under pressure, as described below.

The control means 40 include a control chamber 33 disposed between the intermediate chamber 32, the seat 24, and the filler channel 70.

Furthermore, the control means 40 include a hollow rod 41 extending from a first end provided with a first head 42 towards a second end provided with a second head 43, the hollow rod putting the inlet chamber 31 permanently into communication with the control chamber 33 in co-operation with a first control orifice 55 formed in the stationary wall 50.

The hollow rod 41 is movable in the intermediate and control chambers 32 and 33. The first head 42 then slides in the intermediate chamber 32 while the second head 43 defines the control chamber 33 relative to the intermediate chamber 32.

The first head 42 includes a first plate that closes the filler orifice 51 when the control means 40 require filling under pressure to stop. Similarly, the second head 42 includes a second plate that hydraulically separates the intermediate chamber 32 from the control chamber 33 so that a fluid cannot pass from the intermediate chamber 32 towards the control chamber 33 directly, i.e. without transiting via the hollow rod 41.

The first head 42 possesses a second control orifice 41' co-operating with the first control orifice 55. More precisely, when the first head 42 is pressed against the wall 50, the first head 42 closes the filler orifice 51, with the first control orifice 55 remaining in coincidence with the second control orifice 41'. In contrast, when the first head 42 is not pressed against the wall 50, the first head 42 no longer closes the filler orifice, the first control orifice remaining in coincidence with the second control orifice via the intermediate chamber 32, as shown in FIG. 5, in particular.

In order to put the inlet and control chambers 31 and 33 into communication, the second head 43 is provided with a third control orifice 41".

The control chamber 33 is then still connected to the inlet chamber 31, in particular via the first control orifice 55, the second control orifice 41', the hollow rod 41, the third control orifice 41", and where appropriate the intermediate chamber 32.

Furthermore, the control chamber 33 opens out to the outside of the body 22 via an escape channel 80 that can be seen in FIGS. 7 to 9, this escape channel being in coincidence with the pressure connector 15 when the pressure filler spout 20 is placed in the gravity filler spout 10. It should also be observed that O-rings 19 may be placed on either side of the assembly comprising the escape channel 80 and the pressure connector 15.

Finally, the control means 40 include resilient return means 44, i.e. a spring arranged between the second head 43 and the seat 24 of the pressure filler spout 20.

With reference to FIG. 6, the stationary wall 50 includes a filler orifice 51 provided with a plurality of openings 51', 51", 51'", i.e. three openings distributed uniformly between an outer periphery 53 and an inner periphery 54 of said wall. The wall 50 then has a link arm 52 between each adjacent pair of openings 51', 51", 51'" of the filler orifice 51, each arm extending radially to connect the outer periphery 53 of the stationary wall 50 to its inner periphery 54.

In addition, the stationary wall has a first control orifice 55 suitable for co-operating with the second control orifice 41' of the hollow rod 41.

In the first embodiment shown in FIG. 6, the stationary wall 50 comprises a ring 56 separating the filler orifice 51 from the first control orifice 55.

In the second embodiment shown in FIG. 7, the filler orifice 51 and the first control orifice 55 are not physically separate.

The first control orifice 55 then corresponds to the portion of the filler orifice 51 that is not closed by the first head 42 when said head presses against the stationary wall 50.

FIGS. 5 and 7 also show a check valve 60 required by the standards in force and suitable for co-operating with the filler wheel. The check valve 60 then comprises a plate 61 arranged in the inlet channel 31, the plate 61 being mounted on a leg 63 passing through the inner periphery of the stationary wall 50 and extending into the intermediate chamber 32 to guide possible movement in translation of the plate 61. It should be observed that in order to optimize the dimensions of the device 1, the leg penetrates partially into the inside of the hollow rod 41, but it has no interaction with said hollow rod 41.

Furthermore, the check valve 60 includes a spring 62 arranged between the stationary wall 50 and the plate 61. By way of example, the spring 62 rests against the link arms 52 of the stationary wall 50.

FIGS. 8 and 9 are diagrams for explaining the operation of the device, independently of the embodiment.

With reference to FIG. 8, while filling under pressure, a supply source causes a fluid to penetrate into the inlet chamber 31. The fluid then exerts pressure on the first head 42 causing the hollow rod 41 to move in translation along arrow F0. The volume of the intermediate chamber 32 is thus maximized whereas the volume of the control chamber is minimized.

Following a first path represented by a first continuous line F1, a first fraction of the fluid coming from the inlet chamber 31 penetrates into the hollow rod 41 via the second control orifice 41', escapes from said hollow rod 41 via the third control orifice 41", and then pours into the control chamber 33.

Since the tank is not full, the pressure connector 15 is open, thus enabling fluid to leave the control chamber via the escape channel 80 prior to regaining the tank via the pressure connector 15. The flow rate of fluid through the escape channel 80 maintains fluid pressure in the control chamber 33 at a level that is lower than the pressure exerted by the fluid on the first head 42. Thus, the control chamber 33 cannot press said first head 42 against the filler orifice 51.

Under such circumstances, during filling, a second fraction of the fluid coming from the inlet chamber 31 follows a second path represented by a second continuous line F2. This second fraction of the fluid then passes through the filler orifice 51 that is not closed by the first head 42, then passes into the intermediate chamber 32 and then into the filler channel 70 prior to flowing into a tank, possibly being filtered beforehand by a screen 14 in the gravity filler spout 10.

With reference to FIG. 9, when the tank reaches a predetermined level, a mechanical level detector or a solenoid valve closes the pressure connector 15. The escape channel 80 is then closed.

Under such circumstances, since the control chamber 33 continues to be fed with fluid coming from the inlet chamber and traveling along the first path F1, the pressure in the control chamber 33 increases. This results in the hollow rod 41 of the control means 40 moving in translation along arrow F3, the first head closing the filler orifice 51.

The fluid following the second path F2 no longer penetrates into the intermediate chamber 32, thereby terminating filling.

It should be observed that when the level drops in the tank, the level detector or the solenoid valve releases the pressure connector. Fluid can then escape from the control chamber 33, thus enabling the pressure in said control chamber to be lowered. Thus, pressurizing the inlet chamber when filling under pressure on a future occasion will lead to the hollow rod 41 moving in translation along arrow F0.

Naturally, the present invention may be subjected to numerous variations as to its implementation. Although several embodiments are described above, it will readily be understood that it is not conceivable to identify exhaustively all possible embodiments. It is naturally possible to envisage replacing any of the means described by equivalent means without going beyond the ambit of the present invention.

What is claimed is:

1. A filler device for filling a tank equally well by gravity or under pressure, the filler device being provided with a gravity filler spout including a hollow tube, wherein the filler device includes a pressure filler spout inserted in the gravity filler spout and reversibly fastened thereto, said pressure filler spout including end-of-filling control means that co-operate with a pressure connector of said gravity filler spout when said pressure filler spout is fastened to said gravity filler spout, wherein a closure of the pressure connector activates the end-of-filling control means to co-operate with and close a filler orifice in the pressure filler spout to finish a pressure refueling;

wherein the filler device includes an inlet chamber through which a fluid penetrates into the pressure filler spout during a filling stage, said filler device being provided with an intermediate chamber separated from said inlet chamber by a stationary wall, said stationary wall including the filler orifice connecting said inlet chamber to said intermediate chamber, said intermediate chamber being provided with at least one filler channel suitable for directing said fluid towards a tank, said pressure filler spout being provided with control means for closing said filler orifice at the end of a pressure filling stage.

2. A filler device according to claim 1, wherein said pressure filler spout includes a connection coupling suitable for being locked to a catch wheel by applying a first clamping torque, and fastener means of the device include at least one bayonet stud that co-operates with a groove and with resilient pressure means for reversibly fastening said pressure filler spout to said gravity filler spout by applying a second clamping torque, greater than said first clamping torque.

3. A filler device according to claim 2, wherein said bayonet stud is secured to an outside face of said pressure filler spout, and said groove is provided in an inside face of said gravity filler spout facing said outside face, said resilient pressure means blocking said bayonet stud in a retaining zone of said groove.

4. A filler device according to claim 1, wherein said control means include a control chamber permanently connected with said inlet chamber via a first control orifice provided in said stationary wall that co-operates with a hollow rod that is movable in said intermediate chamber.

5. A filler device according to claim 4, wherein a first end of said hollow rod is provided with a first head and wherein a second end of said hollow rod is provided with a second head, said second head hydraulically separating said control chamber from said intermediate chamber, said first head being capable of closing said filler orifice and having a second control orifice co-operating with said first control orifice to provide a permanent hydraulic connection between said inlet chamber and said hollow rod, said second head having a third control orifice putting said hollow rod into communication with said control chamber.

6. A filler device according to claim 5, wherein said pressure filler spout includes resilient return means urging said first head to be pressed against the stationary wall so as to close the filler orifice.

7. A filler device according to claim 4, wherein said pressure filler spout includes an escape channel suitable for hydraulically connecting said control chamber to a pressure connector of said gravity filler spout when said pressure filler spout is fastened to said gravity filler spout.

8. A filler device according to claim 1, including a pipe opening out into a level detector, said pipe being fastened to said pressure connector.

9. A filler device according to claim 1, including a solenoid valve fastened to said pressure connector.

10. A filler device according to claim 5 wherein the stationary wall is generally planar and defines the filler orifice and the first control orifice extending therethrough.

11. The filler device according to claim 10 wherein the first head is configured to be spaced apart from the stationary wall in a first position, and wherein the first head is configured to be pressed against the stationary wall in a second position with the first and second control orifices in coincidence and the first head closing and blocking the filler orifice.

12. A filler device for filling a tank equally well by gravity or under pressure, the tank being provided with a gravity filler spout including a hollow tube, wherein the device includes a pressure filler spout inserted in the gravity filler spout and reversibly fastened thereto, said pressure filler spout comprising:
- end-of-filling control means that co-operate with a pressure connector of said gravity filler spout when said pressure filler spout is fastened to said gravity filler spout;
- an inlet chamber through which a fluid penetrates into the pressure filler spout during a filling stage;
- an intermediate chamber separated from said inlet chamber by a stationary wall, said stationary wall including a filler orifice connecting said inlet chamber to said intermediate chamber, said intermediate chamber being provided with at least one filler channel suitable for directing said fluid towards a tank; and
- control means for closing said filler orifice at the end of a pressure filling stage, wherein said control means include a control chamber permanently connected with said inlet chamber via a first control orifice provided in said stationary wall that co-operates with a hollow rod that is movable in said intermediate chamber.

13. A filler device for filling a tank by gravity or under pressure, the device comprising:
- a pressure filler spout having:
  - a body defining an inlet chamber, an intermediate chamber, and a control chamber,
  - a stationary wall separating the inlet chamber and the intermediate chamber, the wall defining a filler orifice and a first control orifice, the filler orifice and the first control orifice providing fluid communication between the inlet chamber and the intermediate chamber, and
  - a hollow rod having a first head extending from a first end and a second head extending from a second end, the first head defining a second control orifice, the second head defining a third control orifice, wherein the hollow rod is positioned within the intermediate chamber, the second head separating the intermediate chamber from the control chamber, the hollow rod configured to move between a first position with the first head spaced from the stationary wall and a second position with the first head pressed against the stationary wall to (i) close the filler orifice to prevent fluid communication between the inlet chamber and the intermediate chamber and (ii) provide fluid communication from the inlet chamber to the control chamber via the first, second, and third control orifices.

14. A filler device according to claim 13, further comprising a gravity filler spout having a hollow tube, wherein the pressure filler spout is adapted to be received within the gravity filler spout and reversibly fastened thereto.

15. A filler device according to claim 14 wherein the gravity filler spout has a pressure connector in fluid communication with the control chamber of the pressure filler spout, wherein closing the pressure connector causes the hollow rod to move to the second position, and wherein opening the pressure connector allows the hollow rod to move to the first position.

16. A filler device according to claim 13 wherein the pressure filler spout includes a resilient member positioned within the control chamber and configured to bias the hollow rod towards the stationary wall.

17. A filler device according to claim 13 wherein the stationary wall has an outer periphery adjacent to the body, and a central region, the filler orifice positioned between the outer periphery and the central region, and the first control orifice positioned between the filler orifice and the central region.

18. A filler device according to claim 13 wherein the body of the pressure filler spout includes an annular filler channel surrounding the control chamber, the annular filler channel configured to be directed towards a fuel tank for filling.

19. A filler device according to claim 13 wherein the pressure filler spout includes a check valve having a plate positioned within the inlet chamber and a spring positioned between the plate and the stationary wall.

* * * * *